US008416796B2

(12) United States Patent
Forster et al.

(10) Patent No.: US 8,416,796 B2
(45) Date of Patent: Apr. 9, 2013

(54) SYSTEMS AND METHODS FOR MANAGING VIRTUAL SWITCHES

(75) Inventors: R. Kyle Forster, San Francisco, CA (US); Omar Baldonado, Palo Alto, CA (US); Robert K. Vaterlaus, Oakland, CA (US); Guido Appenzeller, Menlo Park, CA (US)

(73) Assignee: Big Switch Networks, Inc., Mountain View, CA (US)

( * ) Notice: Subject to any disclaimer, the term of this patent is extended or adjusted under 35 U.S.C. 154(b) by 163 days.

(21) Appl. No.: 13/103,012

(22) Filed: May 6, 2011

(65) Prior Publication Data

US 2012/0281698 A1 Nov. 8, 2012

(51) Int. Cl.
*H04L 12/28* (2006.01)
*H04L 12/56* (2006.01)
(52) U.S. Cl. .................................. 370/419; 370/392
(58) Field of Classification Search .................. 370/392, 370/419
See application file for complete search history.

(56) References Cited

U.S. PATENT DOCUMENTS

| 5,751,967 | A | 5/1998 | Raab |
| 5,892,912 | A | 4/1999 | Suzuki |
| 6,674,756 | B1 | 1/2004 | Rao |
| 7,843,906 | B1 * | 11/2010 | Chidambaram et al. ...... 370/386 |
| 7,869,439 | B1 | 1/2011 | Ramberg et al. |
| 2008/0144635 | A1 * | 6/2008 | Carollo et al. ................. 370/397 |
| 2009/0183239 | A1 | 7/2009 | Carbonneau et al. |
| 2010/0169880 | A1 * | 7/2010 | Haviv et al. ........................ 718/1 |
| 2010/0257263 | A1 | 10/2010 | Casado et al. |
| 2011/0051624 | A1 * | 3/2011 | Gnanasekaran et al. ...... 370/254 |

FOREIGN PATENT DOCUMENTS
WO 2006093929 9/2006

OTHER PUBLICATIONS

CISCO, "Layer 2 Switching", XP002686719 (May 22, 2009) (12 pages) [Retrieved on Nov. 8, 2012]. Retrieved from the Internet: <URL: http://www.cisco.com/en/US/docs/switches/datacenter/nexus1000/sw/4_2_1_s_v_1_4/troubleshooting/ configuration/guide/n1000v_trouble_91ayer2.pdf>.
CITRIX, "Citrix XenServer 5.6 Feature Pack 1vSwitch ControllerUser Guide", XP002686720 (Dec. 9, 2010) (37 pages) [Retrieved on Nov. 8, 2012] Retrieved from the Internet: <URL: http://support.citrix.com/servlet/KbServlet/download/25587-102-666200/dvs_controller.pdf>.
Pfaff et al., OpenFlow Switch Specification, Dec. 31, 2009, 42 pages.
McKeown et al., OpenFlow: Enabling Innovation in Campus Networks, Mar. 14, 2008, 6 pages.
Cisco Systems, Cisco Catalyst 6500 Architecture, 1992-2007, 28 pages.

(Continued)

*Primary Examiner* — Ronald Abelson
(74) *Attorney, Agent, or Firm* — Treyz Law Group; Chih-Yun Wu

(57) ABSTRACT

Network switches that are controlled by a controller server may contain ports through which network packets are received and forwarded. An architect may configure the controller server to create virtual switches. Each virtual switch may be formed from a subset of the ports of the network switches. The architect may assign administrators to the virtual switches. The administrators may configure the virtual switches. An administrator may use a command line interface to configure a virtual switch. The administrator may use commands such as a show port command, an access list command, a show access list command, and a membership rule command to manage the virtual switch. The controller server may prevent the administrator from logging on to virtual switches that have been assigned to other administrators.

20 Claims, 18 Drawing Sheets

OTHER PUBLICATIONS

Casado et al., "SANE: A Protection Architecture for Enterprise Networks," Usenix Security, Aug. 2006 (15 pages).

Casado et al., "Ethane: Taking Control of the Enterprise," Conference of Special Interest Group on Data Communication (SIGCOMM), Japan, Aug. 2007 (12 pages).

Koponen et al., "Onix: A Distributed Control Platform for Large-scale Production Networks," Usenix Security, Oct. 2010 (14 pages).

Sherwood et al., "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf>.

Cisco Router Configuration Tutorial. Tutorial [online]. Gentry, Apr. 30, 2006 [retrieved on May 9, 2011]. Retrieved from the internet: <URL:http://pages.swcp.com/~jgentry/topo/cisco.htm#sect3>.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D virtual-switch name

FIG. 11A membership-rule switch/port

FIG. 11B membership-rule host mac address

FIG. 11C membership-rule tag: tag identifier

FIG. 11D username uname password pswd

FIG. 11E

```
# show port

PORT    STATUS      SPEED
 A      CONNECTED   100    . . .
 B      CONNECTED    10
           ⋮
```

FIG. 11F

```
# show access list

RULE NAME  ALLOW/DENY   SRC       DEST      PORT   ALL
  RULE 1      DENY     INTERNET    EH1       B    INBOUND  . . .
  RULE 2      ALLOW     EH1      INTERNET    A    OUTBOUND
                          ⋮
```

FIG. 11G

| # access-list | rulename | allow or deny | source | destination | port | inbound or outbound |

ADD RULE COMMAND

FIG. 11H

| RULE NAME | ALLOW/DENY | SOURCE | DESTINATION | PORT | ALL |
|---|---|---|---|---|---|
| RULE 1 | DENY | INTERNET | EH1 | B | INBOUND |
| RULE 2 | ALLOW | EH1 | INTERNET | A | OUTBOUND |
| ⋮ | | | ⋮ | | |

FIG. 13

SYSTEMS AND METHODS FOR MANAGING VIRTUAL SWITCHES

BACKGROUND

This relates to communication networks, and more particularly, to managing virtual switches.

Packet-based networks such as the internet and local data networks that are connected to the internet include network switches. Network switches are used in forwarding packets from packet sources to packet destinations.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Each network switch on which a controller client has been implemented (sometimes referred to herein as client switches) may be provided with an access control list (ACL) with entries that specify types of packets that are allowed to traverse the switch and entries that specify types of packets that are not allowed to traverse the switch. For example, a specific entry of the access control list (ACL) may specify that packets from a particular internet protocol (IP) address are not allowed to traverse the switch.

Each client switch may include ports through which network packets are conveyed. For example, a first network device coupled to a first port of a client switch may transmit packets to a second network device that is coupled to a second port of the client switch to the first port. The client switch may forward the packets to the second network device by transmitting the packets from the second port.

It may be desirable to form groups of client switches and ports. For example, end hosts such as electronic payment clients (e.g., devices used to communicate with electronic payment servers to perform payment transactions) may be coupled to various ports on the client switches in the network. There may be many electronic payment clients coupled to ports on the client switches in the network (e.g., hundreds or thousands). The many electronic payment clients may generate large amounts of network traffic. It may be desirable to control the large amounts of network traffic associated with the electronic payment clients. To prevent sensitive payment information such as credit card numbers from being transmitted to other devices, it may be desirable to prevent packets originating from the ports associated with the electronic payment clients from reaching destinations other than the electronic payment server.

It would therefore be desirable to be able to provide improved arrangements for controlling the traffic in a communications network by configuring and controlling the network switches in the communications network.

SUMMARY

Network switches that contain controller clients may be controlled by a controller server. The controller server and the controller clients may use network protocol stacks to communicate over network connections.

Network switches may contain ports through which network packets are received and forwarded. An architect user may configure the controller server to create virtual switches from subsets of the ports of the network switches. The architect may configure the controller server by logging on to a command line interface and issuing commands using the command line interface. The architect may configure the controller server to assign administrators to virtual switches.

An administrator may configure a virtual switch using a command line interface. To configure the corresponding virtual switch, the administrator may use a command line interface to configure a virtual switch by issuing commands using the command line interface. For example, the administrator may issue a show port command, a show access list command, and a membership rule command to manage the virtual switch. The controller server may prevent the administrator from logging on to virtual switches that have been assigned to other administrators.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fourth physical port in a switch in accordance with an embodiment of the present invention.

FIGS. 11A, 11B, 11C, 11D, 11E, 11F, 11G, and 11H are diagrams of illustrative commands that may be issued by users such as architects and administrators to configure a virtual switch in accordance with an embodiment of the present invention.

FIG. 13 is a diagram of an access control list containing rules that control network traffic of a virtual switch in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment.

Network switches range in capability from relatively small Ethernet switches and wireless access points to large rack-based systems that include multiple line cards, redundant power supplies, and supervisor capabilities. Ethernet switches are sometimes used near the edge of a network and are therefore sometimes referred to as edge switches or top-of-rack switches. Larger rack-based systems are often used in network core locations and are sometimes referred to as routers, core routers, or core switches. In some network environments, network switches that lie between the core switches and the edge switches are referred to as aggregation switches or distribution switches. Aggregation switches and core switches may sometimes collectively be referred to as non-edge switches.

It is not uncommon for networks to include equipment from multiple vendors. As an example, a network for a university or corporate campus might include core switches from one vendor, edge switches from another vendor, and aggregation switches from yet another vendor. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
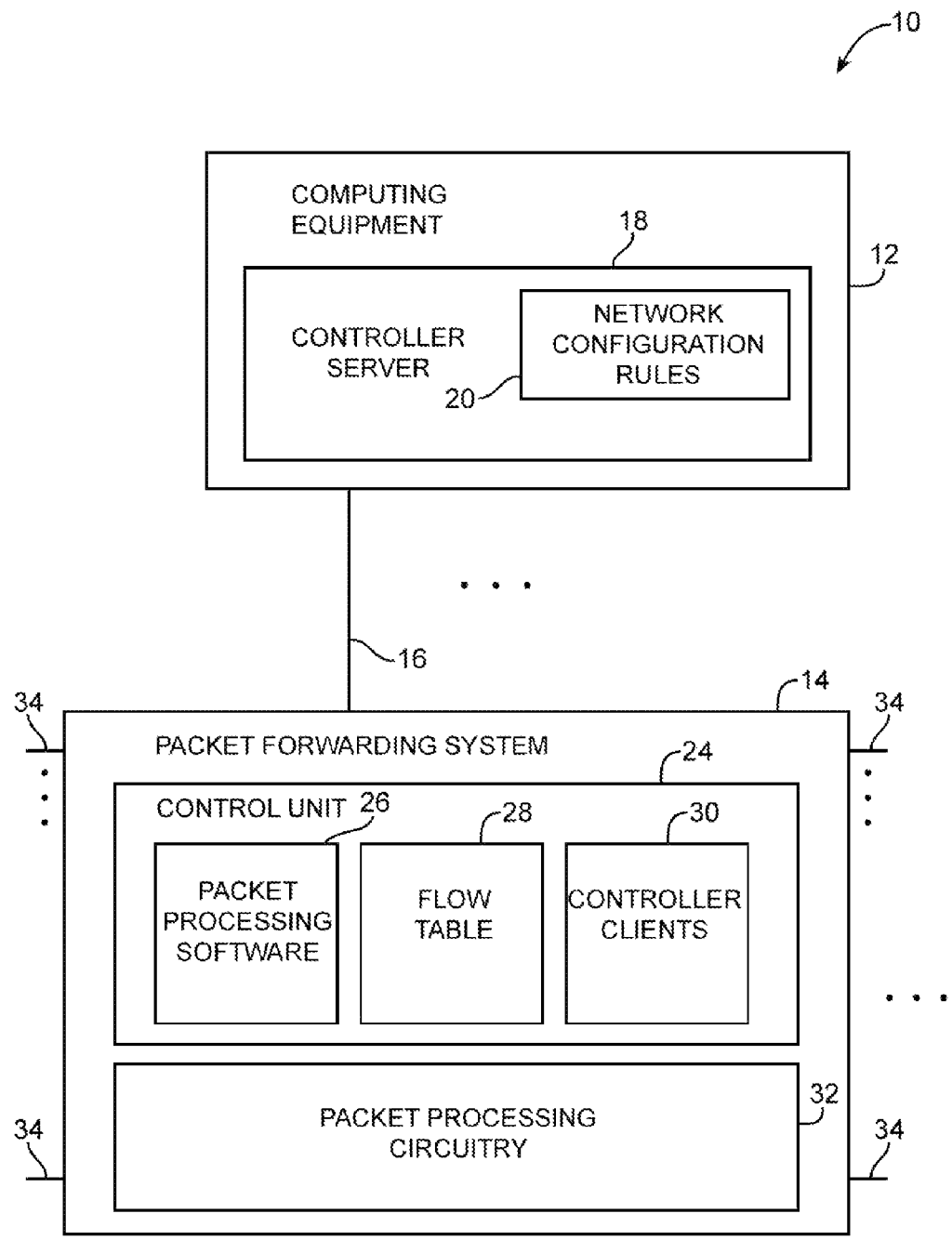
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 10 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34. Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

Figure 2:
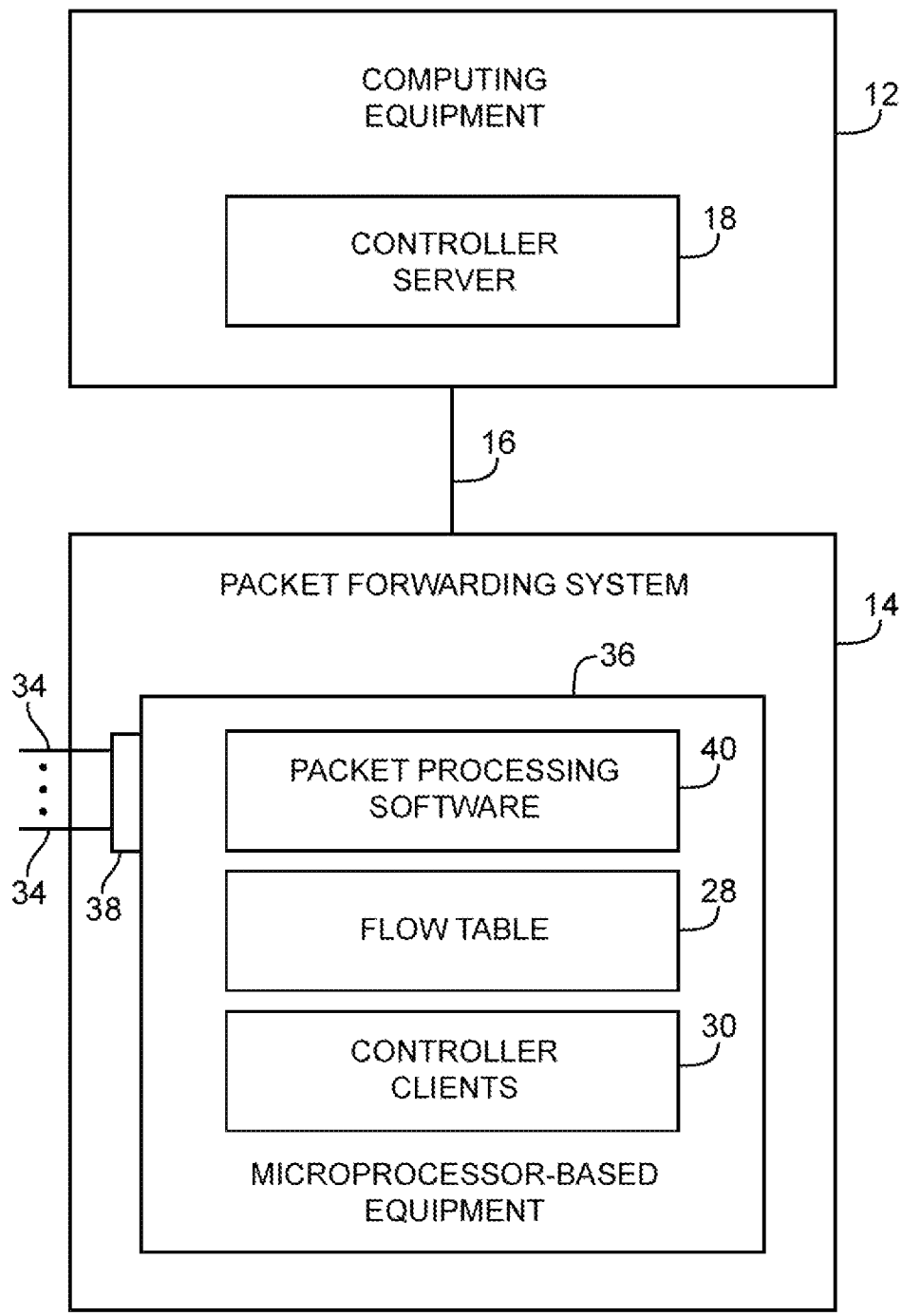
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
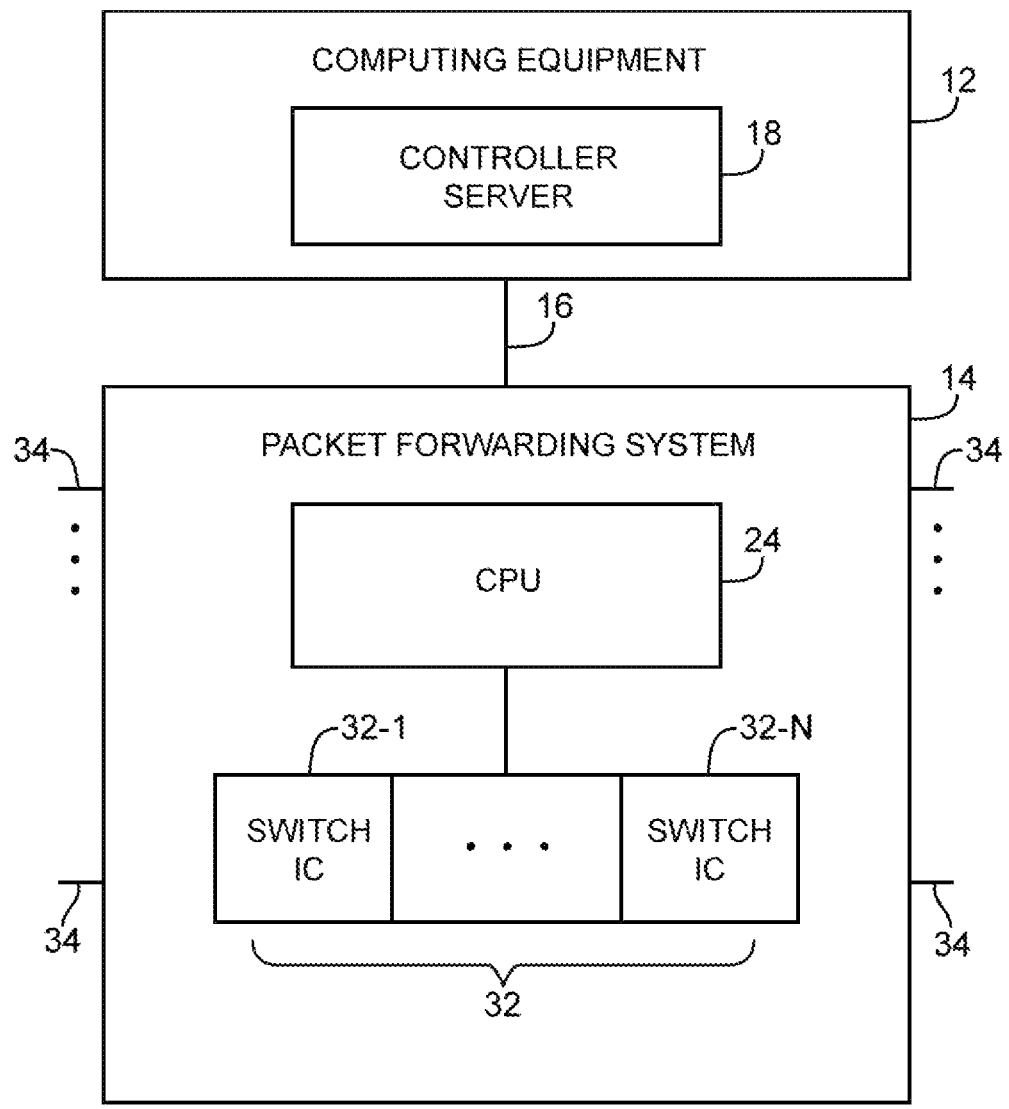
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
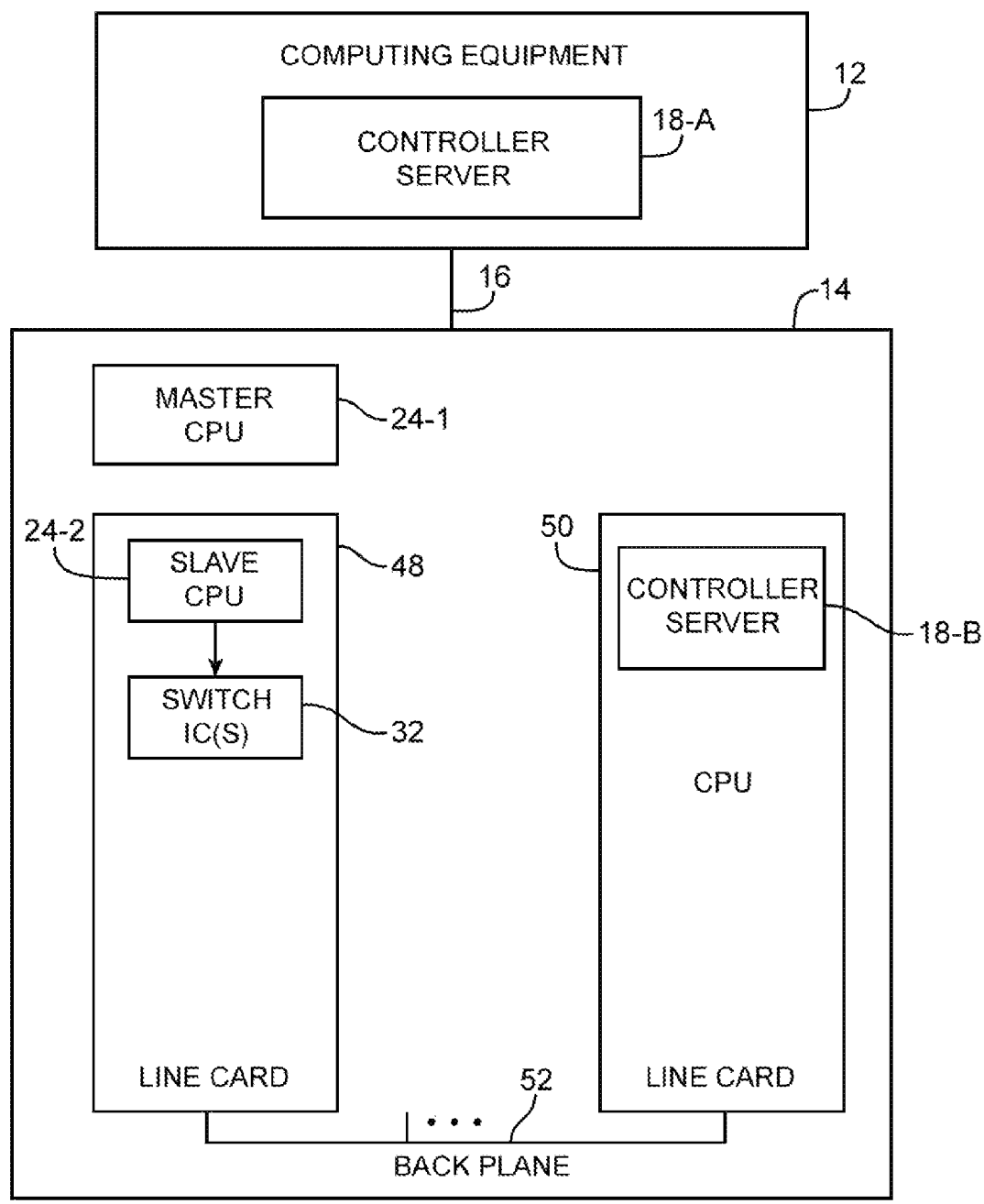
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch (packet forwarding system) 14 may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
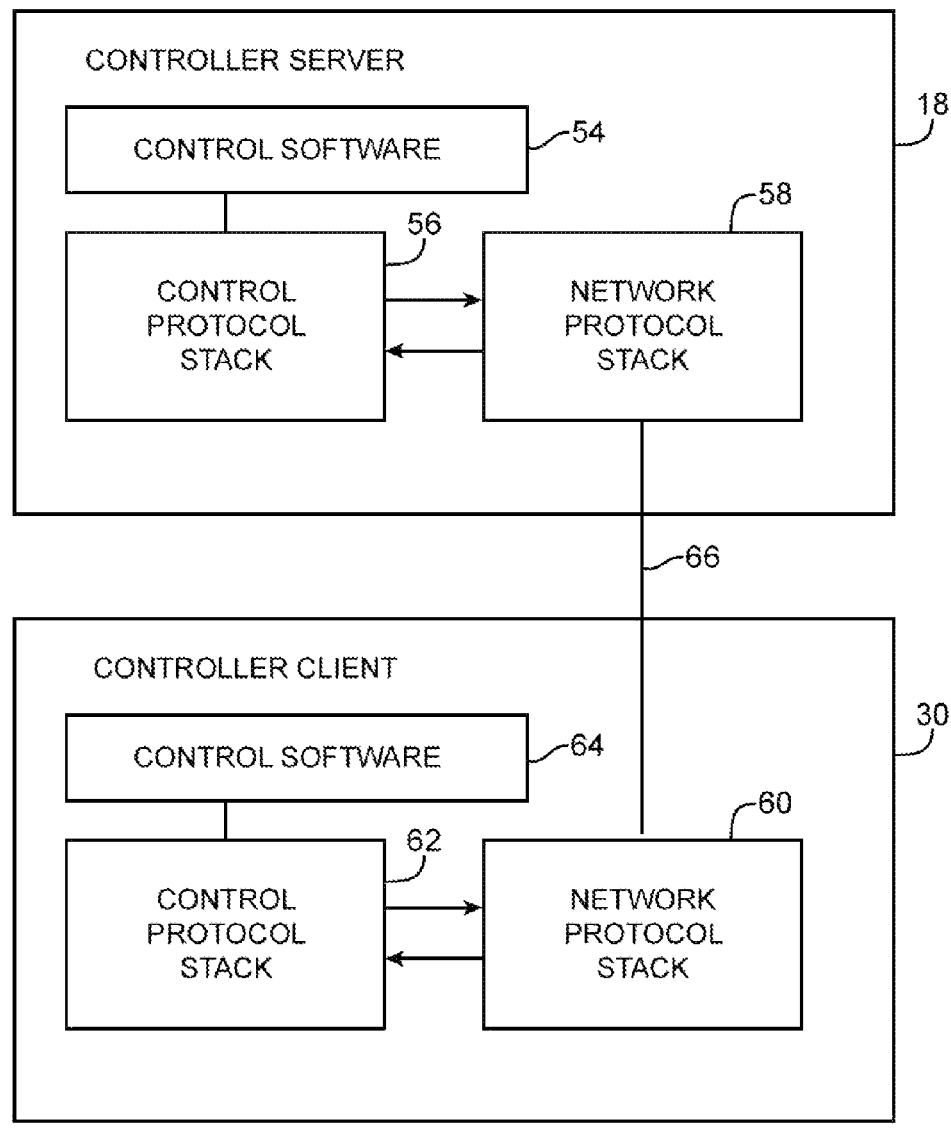
FIG. 5 is a diagram of a controller server and controller client that are communicating over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
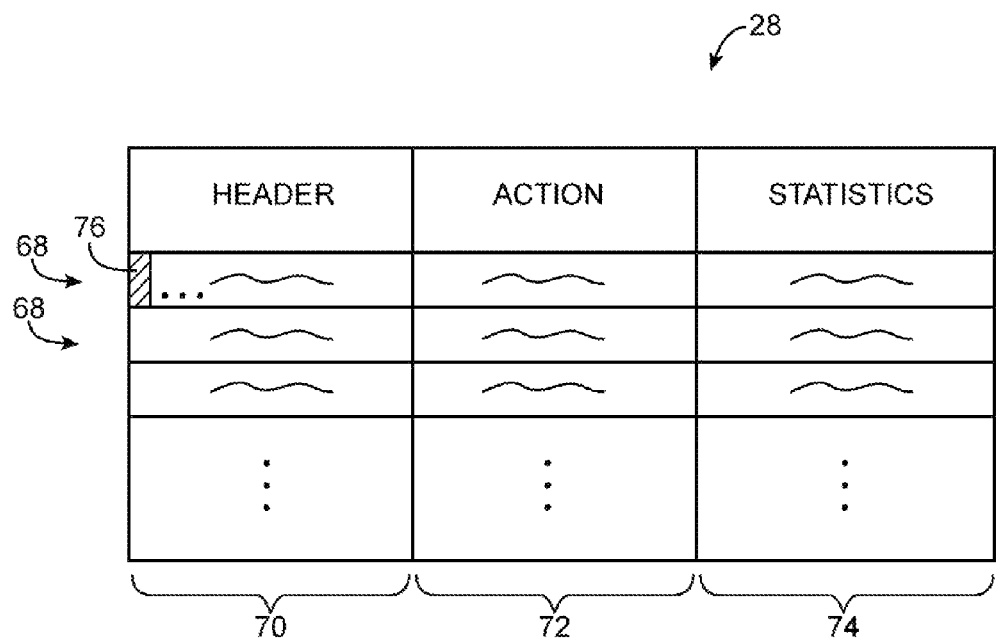
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (row) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) id, VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum spanning tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
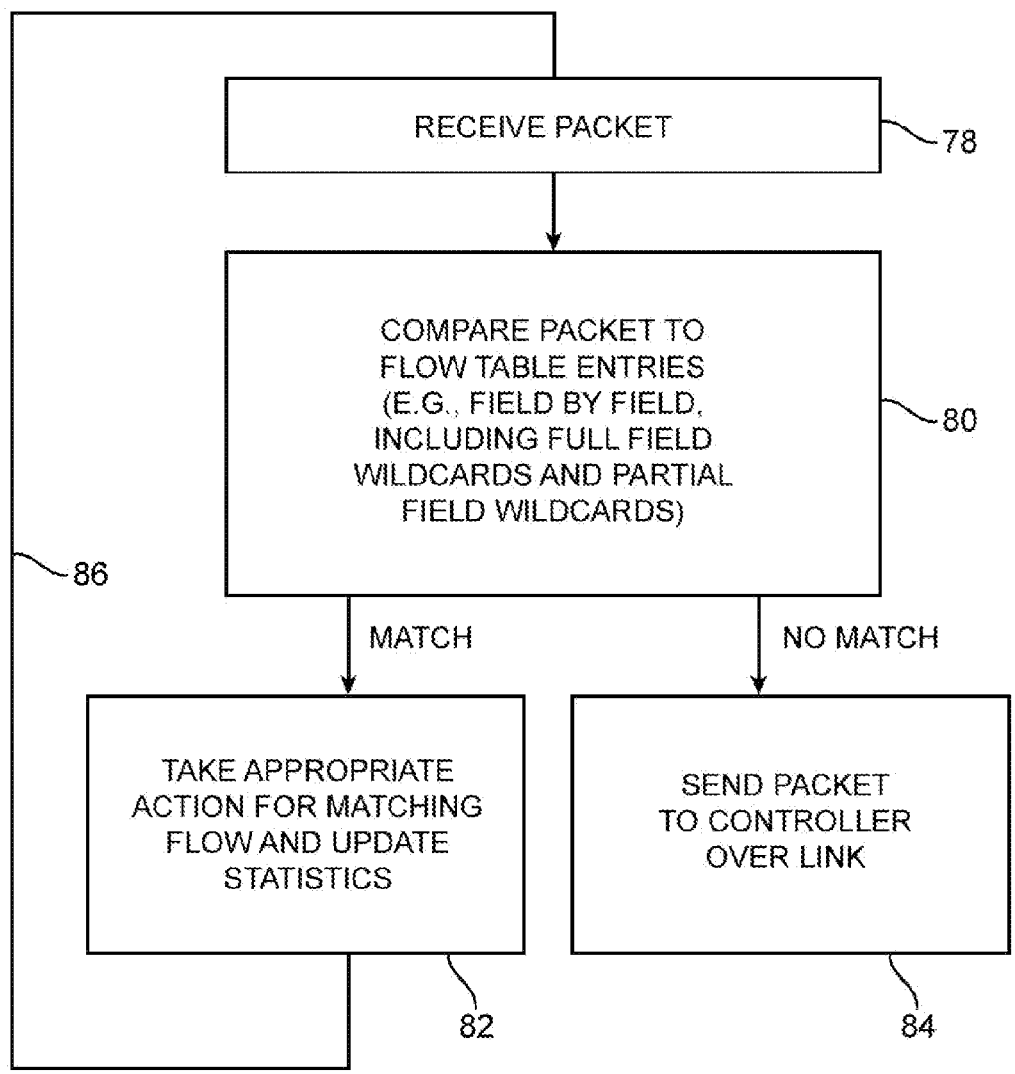
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
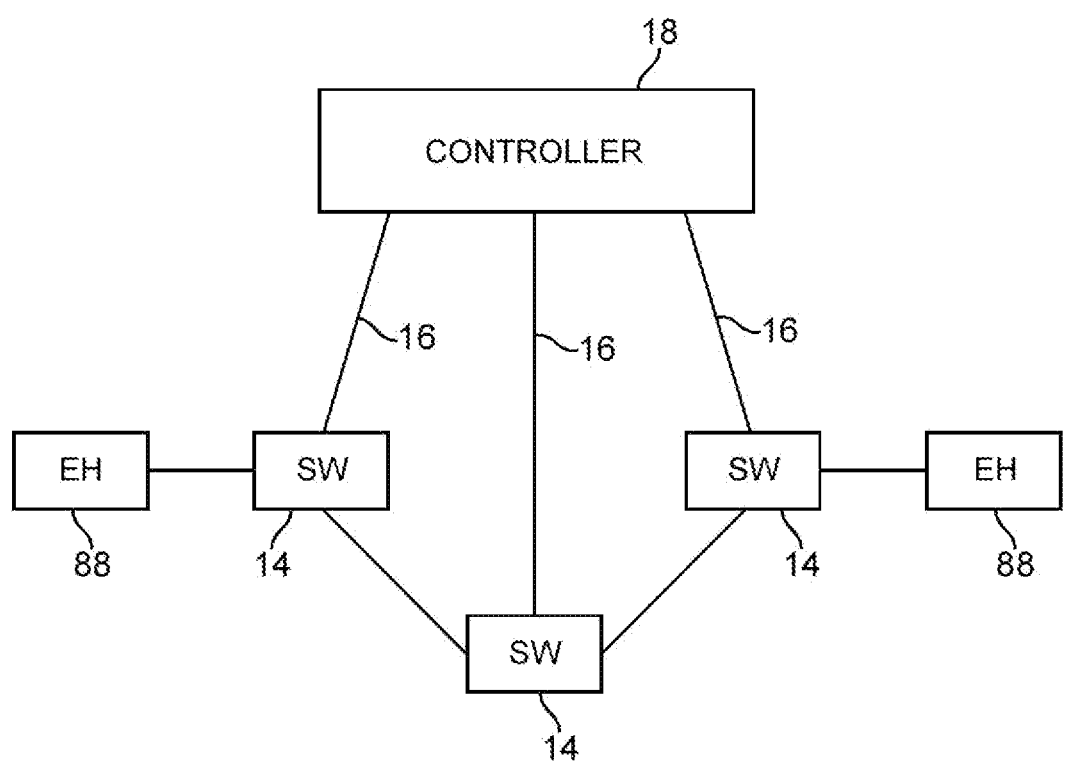
FIG. 8 is a diagram of a network showing how a controller can control multiple network switches in accordance with an embodiment of the present invention.

FIG. 8 is a diagram of an illustrative network showing how controller server 18 may control multiple switches 14 using multiple associated network connections 16. In the illustrative network shown in FIG. 8, a first end host (the end host 88 on the left side of FIG. 8) is communicating with a second end host (the end host 88 on the right side of FIG. 8). End hosts 88 may be computers (e.g., personal computers), servers, clusters of computers, set-top boxes, handheld devices, or any other computing equipment. During part of the communications between end hosts 88, the first end host may be serving as a packet source and the second end host may be serving as a packet destination. At other times, roles may be reversed, so that the second end host is serving as a packet source while the first end host is serving as a packet destination.

To ensure that packets are forwarded correctly through the network, controller 18 may provide each of the switches shown in FIG. 8 with appropriate flow table entries. With one suitable arrangement, controller server 18 may supply switches 14 with flow table entries in response to receipt of a packet that has been sent to controller server 18 from a switch that did not detect a match between an incoming packet and its flow table entries. When controller server 18 receives the packet, controller server 18 can use network configuration rules 20 (FIG. 1), information from the packet, network topology information, and other information in determining appropriate entries for flow tables 28 for switches 14. Controller server 18 may then provide the flow table entries to switches 14 to configure the switches for forwarding packets through the network. With another suitable arrangement, controller server 18 provides flow tables 28 to switches 28 during setup operations.

Regardless of whether controller server 18 provides switches 14 with flow table entries in advance or in real time in response to receipt of a packet from a switch, once each switch 14 has been provided with the flow table entries, the flow table entries will ensure that the switches 14 will forward the packets along a satisfactory path through the network.

Figure 9:
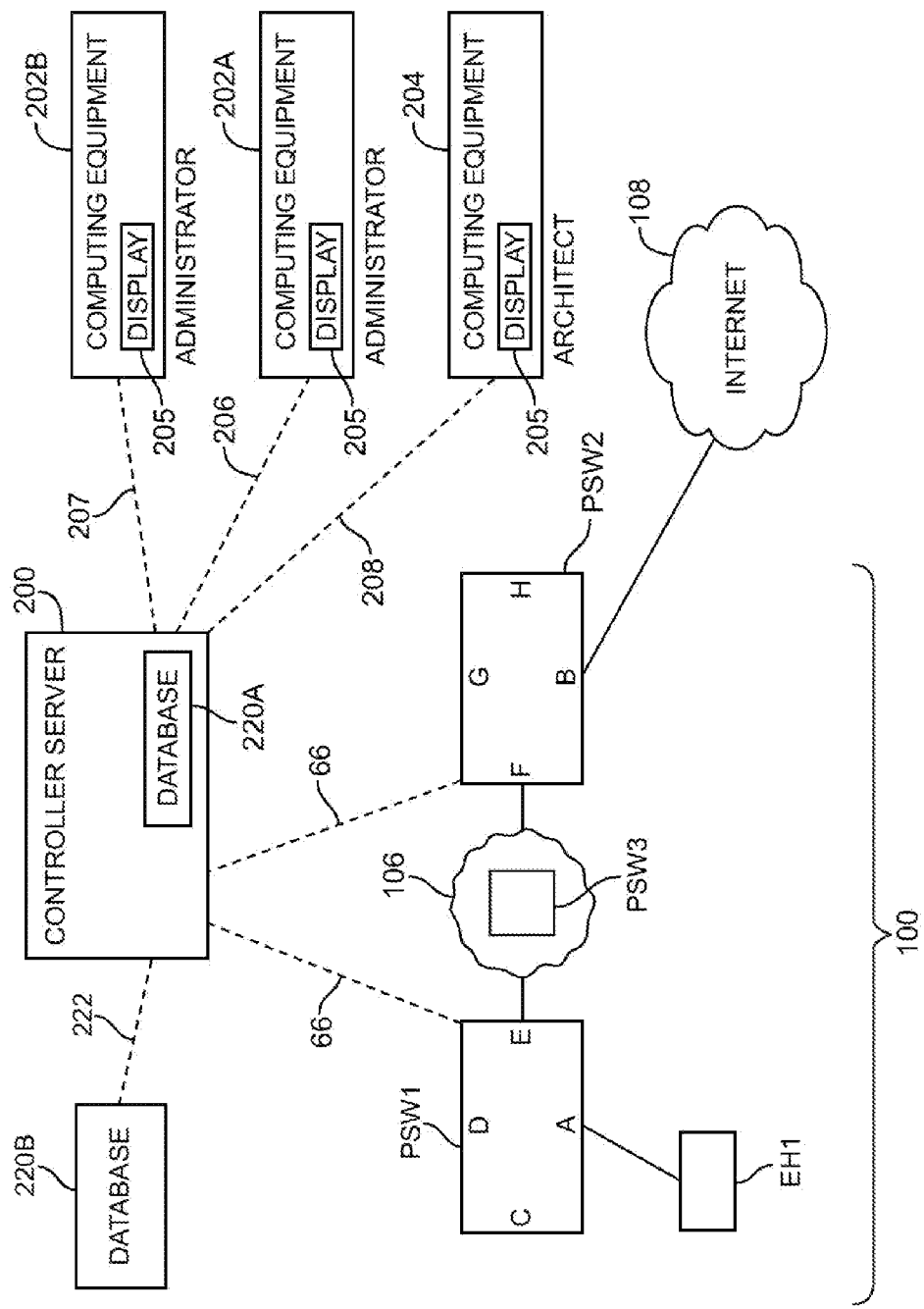
FIG. 9 is a diagram of an illustrative network showing how switches may be distributed through different portions of the network in accordance with an embodiment of the present invention.

A controller server may be remotely configured by users via network devices. An illustrative network 100 containing a controller server 200 that may be remotely configured by users (e.g., an administrator 202A and an architect 204) is shown in FIG. 9. As shown in FIG. 9, administrators 202 and an architect 204 may configure a controller server 200 via paths 206 and 208. Paths 206 and 208 may be a network connection or other suitable paths for configuring controller server 200. The administrators and the architect may be users operating network devices such as computers, remote terminals, mobile devices, or other suitable network devices. Suitable network devices may include computing equipment with displays (e.g., a laptop with an on-screen display). An administrator 202 or architect 204 may configure controller server 200 by modifying entries in databases (e.g., databases 220) that specify rules for network operation and configuration.

Controller server 200 may communicate with network switches that contain controller clients (e.g., physical client switches PSW1 and PSW2) over network paths 66. Client switches PSW1 and PSW2 may contain physical ports through which network traffic is routed (e.g., client switch PSW1 may include physical ports A, C, D, and E, and client switch PSW2 may include physical ports B, F, G, and H). Client switches PSW1 and PSW2 may be separated by network 106 (e.g., packets sent between switch cluster 102 and switch cluster 104 must traverse network 106). Network 106 may include zero or more non-client switches configured in a network topology that routes packets between client switch PSW1 and client switch PSW2. For illustrative purposes, network 106 is shown in FIG. 9 as a single non-client switch PSW3, but, in general, network 106 may include any number of switches.

Network devices may be coupled to the ports of the client switches. For example, an end host EH1 may be coupled to port A of client switch PSW1 and the internet may be may be coupled to port B of client switch PSW2. Network 100 may communicate with internet networks through port B of client switch PSW2 (e.g., network traffic destined for the internet may be forwarded to port B of client switch PSW2 and network traffic may be received from the internet on port B of client switch PSW2).

It may be desirable to form groups from a subset of the ports on various client switches. For example, end hosts such as electronic payment clients (e.g., devices used to communicate with electronic payment servers to perform payment transactions) may be coupled to some of the ports on the client switches in the network. It may be desirable to form a group containing only the electronic payment clients and the electronic payment servers to more conveniently control network traffic associated with the electronic payment clients (e.g., to prevent sensitive payment information such as credit card numbers from being transmitted to other devices, it may be desirable to prevent packets originating from the ports associated with the electronic payment clients from reaching destinations other than the electronic payment server).

Figure 10:
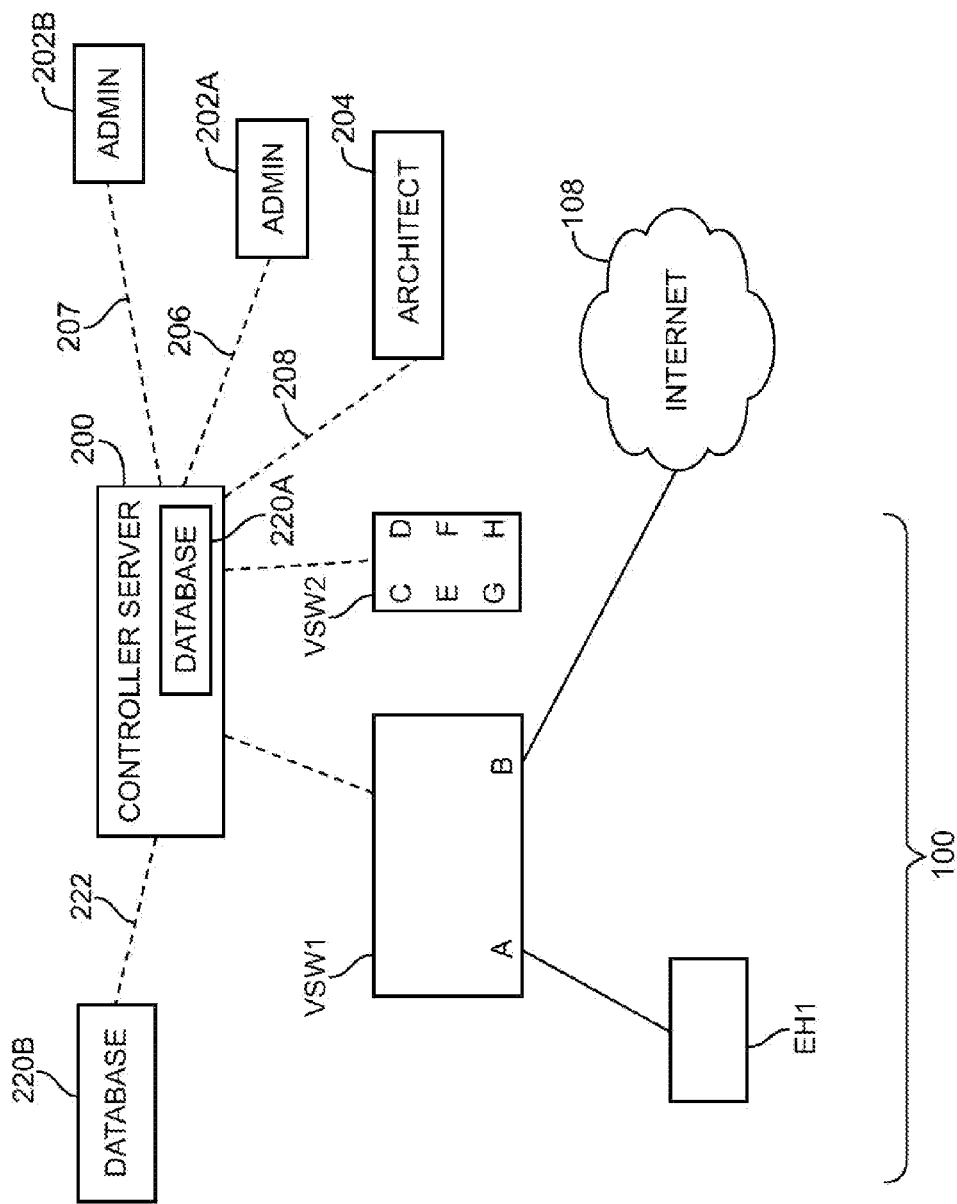
FIG. 10 is a diagram of a network showing how an architect and an administrator may configure switches containing controller clients by communicating with a controller server in accordance with an embodiment of the present invention.

To form a group containing a subset of the ports of the client switches, controller server 200 may create a virtual switch. For example, a virtual switch may be formed from a subset of physical ports in network 100 that correspond to electronic payment clients. Each virtual switch may have virtual input-output ports that correspond to respective physical ports from the subset of physical ports. The virtual input-output ports may represent a border between traffic internal to the virtual switch (e.g., traffic between virtual input-output ports) and traffic external to the virtual switch (e.g., traffic destined to or received from ports not associated with the virtual switch). In the arrangement of FIG. 10, an architect 204 may send control commands to controller server 200 via path 208 to create groups from ports of client switches. For example, an architect 204 may configure controller server 200 to create a first virtual switch VSW1 from port A of client switch PSW1 and port B of client switch PSW2. Architect 204 may configure controller server 200 to create a second virtual switch VSW2 from ports C, D, and E of client switch PSW1 and ports F, G, and H of client switch PSW2. Each given virtual switch may have its own flow table and other data structures that may be stored on controller server 200 in databases such as database 220A (e.g., controller server 200 may store a flow table that specifies how packets are forwarded between the input-output ports of the given virtual switch).

Architect 204 may configure controller server 200 to allow administrators (e.g., administrator 202A and administrator 202B) to configure the operation of the virtual switches. Architect 204 may configure the network of physical client switches to allow the administrators to configure the operation of the virtual switches as if each virtual switch were a physical client switch. For example, virtual switch VSW1 may be formed from port A of physical client switch PSW1 and port B of physical client switch PSW2. To form virtual switch VSW1, an architect 204 may direct controller server 200 to modify or create entries in the flow tables of client switch PSW1 and client switch PSW2. The flow tables may be modified so that network traffic (i.e., network packets) directed to the ports associated with virtual switch VSW1 are forwarded as if virtual switch VSW1 were a physical switch.

For example, an entry may be added to the flow table of physical switch PSW1 that directs network packets that arrive at port A to port E and an entry may be added to the flow table of physical switch PSW2 that directs network packets that arrive on port F to port B. In this arrangement, network 100 may be configured to forward network traffic from port A of virtual switch VSW1 to port B of virtual switch VSW1.

Architect 204 may configure controller server 200 to assign a virtual switch to each administrator 202. In other words, architect 204 may assign each administrator 202 to a virtual switch. For example, architect 204 may assign virtual switch VSW1 to administrator 202A and virtual switch VSW2 to administrator 202B. To assign a virtual switch to an administrator, architect 204 may provide controller server 200 with the administrator's login information (e.g., a user name and a password that are associated with the administrator). Controller server 200 may store the login information in database 220A. Each administrator may only be able to configure the virtual switch assigned to the administrator (e.g., administrator 202A may only be able configure the flow table of virtual switch VSW1 and administrator 202B may only be able to configure the flow table of virtual switch VSW2).

To configure an assigned virtual switch (e.g., to modify the flow table associated with the virtual switch), an administrator may connect to controller server 200 with login information (e.g., a user name and password) that is associated with the administrator. To connect to controller server 200, the administrator may use network protocols such as secure shell (SSH) or other protocols suitable for securely communicating with controller server 200.

Controller server 200 may authenticate the login information (e.g., by comparing the login information provided by the administrator to login information stored in database 220A and transmitting a reply to the administrator based on the results of the comparison). The administrator may connect to an interface on controller server 200 such as a command line interface (CLI), graphical user interface (GUI), or any other suitable interface for communicating with controller server 200 via a network path.

An architect 204 that is connected to a command line interface (CLI) on controller server 200 may use the command line interface to create and configure virtual switches. FIGS. 11A-11E show illustrative commands that architect 204 may issue to the command line interface to create and configure a virtual switch.

FIG. 11A shows an illustrative virtual-switch command that may be used to create a virtual switch. After connecting to controller server 200 (e.g., by logging in to controller server 200 with a corresponding user name and password), architect 204 may issue a virtual-switch command that specifies a name (i.e., a virtual switch name). For example, architect 204 may issue a virtual switch command with the virtual switch name "VSW1." Controller server 200 may receive the virtual-switch command and create a virtual switch with the specified virtual switch name. Controller server 200 may store data structures that correspond to the virtual switch in local database 220A.

Virtual ports may be added to a virtual switch using membership-rule commands (sometimes referred to herein as add port commands). FIGS. 11B-11D show illustrative membership-rule commands that may be issued by an architect on the command line interface associated with a virtual switch to add virtual ports to the virtual switch that correspond to network devices or physical switch ports. Each membership-rule command may identify a port, network device, or multiple network devices to add to the virtual switch.

As shown in FIG. 11B, the architect may specify a port of a corresponding physical switch (sometimes referred to herein as a switch/port pair). For example, to add port A to virtual switch VSW1, the architect may issue a membership-rule command (sometimes referred to herein as a add port command) that identifies port A of physical switch PSW1.

As shown in FIG. 11C, the architect may specify a MAC address corresponding to a specific network device. For example, a laptop belonging to a computer science department of a university may have a specific MAC address. It may be desirable to add all network devices that belong to the computer science department to a virtual switch (e.g., VSW1) associated with the computer science department. In this case, the architect may issue a membership-rule command that specifies the MAC address of the laptop. In response to receiving a membership-rule command that specifies the MAC address of the laptop, the controller server may dynamically update the virtual ports of the virtual switch to accommodate changes in the network that are associated with the specified MAC address. For example, if the laptop is connected to port A of physical switch PSW1, the controller server may add a virtual port to virtual switch VSW1 that corresponds to port A of physical switch PSW1. If the laptop is disconnected from port A and connected to port B of physical switch PSW2, the controller server may modify the virtual port so that it corresponds to port B of physical switch PSW2.

As shown in FIG. 11D, the architect may specify a tag with a tag identifier that corresponds to zero or more network devices. For example, a tag may be specified with the tag identifier "vmname electronic payment client." In this case, all network devices associated with the tag "vmname electronic payment client" may be added to the virtual switch. To determine whether or not a given network device is associated with the tag, controller server 200 may search databases such as local database 220A or remote database 220B for entries that match the tag.

The add port commands of FIGS. 11B, 11C, and 11D are shown with the "membership-rule" character string. However, it should be understood that any character string suitable for use with a command line interface may be used in place of the "membership-rule" character string.

An architect may add administrators (e.g., user names and passwords corresponding to the administrators) to a virtual switch. The architect may add an administrator to a virtual switch by issuing an add user command such as the username command of FIG. 11E. As shown in FIG. 11E, the username command may include a user name (e.g., uname) and a password (e.g., pswd).

An architect 204 or an administrator 202 that is connected to a command line interface (CLI) on controller server 200 may use the command line interface to configure a corresponding virtual switch. FIGS. 11A-11H show illustrative commands that either an architect 204 or an administrator 202 may use to configure a virtual switch when connected to a command line interface (CLI) of controller server 200.

As shown in FIG. 11F, an administrator that is logged in to the command line interface for a given virtual switch may issue a show port command that displays the ports associated with the given switch. In the example of FIG. 11F, an administrator that is logged in to the command line interface for virtual switch VSW1 may issue a show port command on the command line interface. Controller server 200 may receive the show port command and display only information for the virtual ports associated with virtual switch VSW1 (e.g., information about port A and port B). The information displayed may include the status of each port (e.g., whether or not a device is connected to the port), the physical capabilities of the port (e.g., how much data per second can be transferred through the port), and other information associated with the port.

An administrator may add rules to each port using the add rule command shown in FIG. 11E. The administrator may add a rule by issuing the access-list command of FIG. 11E (sometimes referred to herein as an add rule command). The access-list command may include a rulename that identifies the rule, a field that identifies whether the rule allows or denies network traffic, a network source, a network destination, a virtual switch port, and a field identifying whether the rule controls inbound or outbound traffic. For example, the administrator may issue an access-list command that denies network traffic arriving from the internet to virtual port B that is inbound to a local end host EH1.

Figure 12:
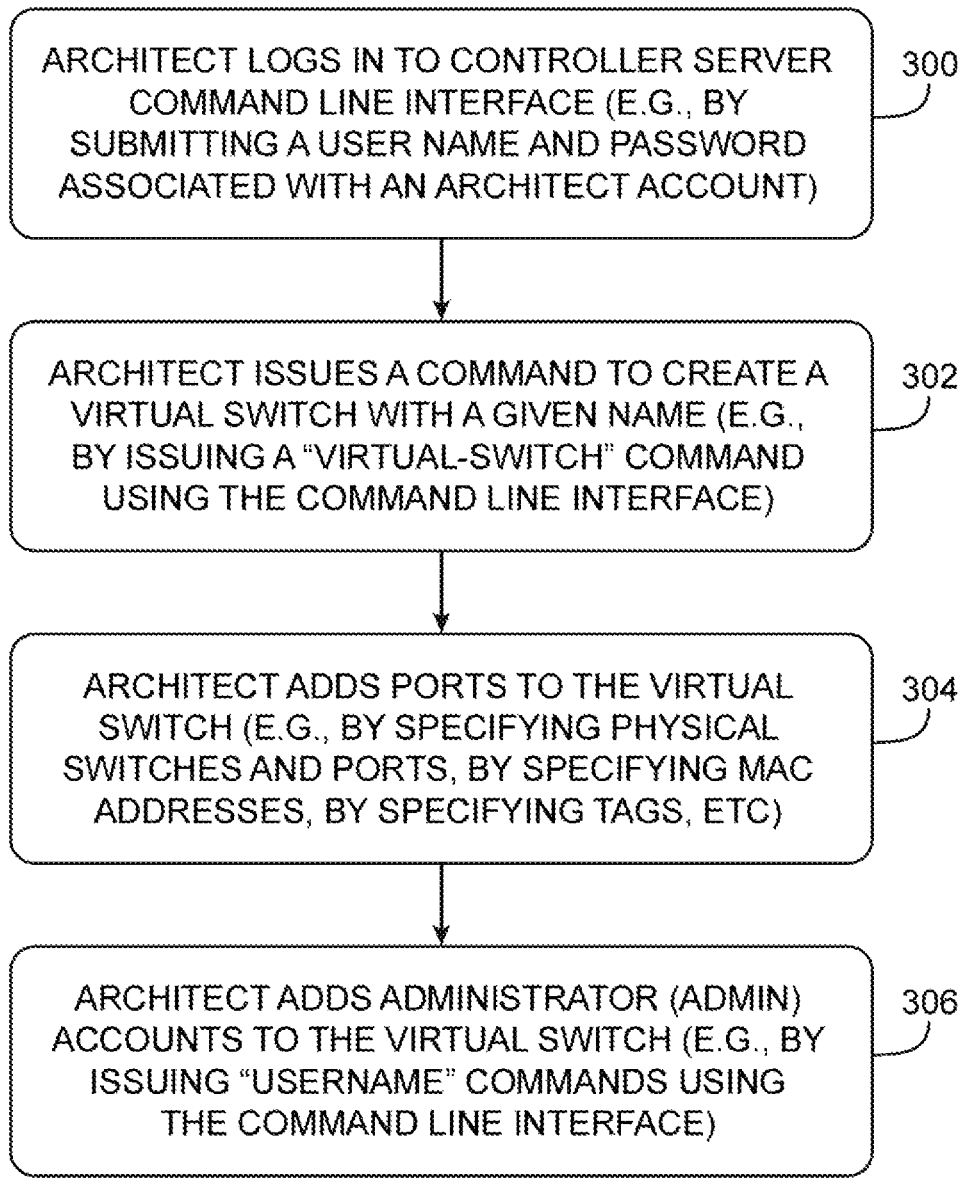
FIG. 12 is a flow chart with illustrative steps that an architect may perform to create and configure a virtual switch in accordance with an embodiment of the present invention.

To form a virtual switch, an architect 204 may perform the illustrative steps of FIG. 12.

During the operations of step 300, the architect may connect to controller server 200 using login information associated with the architect. For example, the architect may log in to a command line interface (CLI) on controller server 200 by using a user name and password that corresponds to the architect. To connect to controller server 200, the architect may use the secure shell (SSH) protocol or other protocols suitable for connecting to controller server 200 via network paths.

During the operations of step 302, the architect may create a virtual switch by issuing a virtual-switch command on the command line interface (e.g., the virtual-switch command of FIG. 11A). The architect may specify a name (e.g., VSW1) for the virtual switch. In response to receiving the virtual-switch command, controller server 200 may create a virtual switch with the name specified by the architect. The virtual switch may be stored in appropriate storage locations on controller server 200 (e.g., database 220A).

During the operations of step 304, the architect may add ports to the virtual switch by issuing add port commands on the command line interface (CLI) (e.g., the membership-rule commands of FIGS. 11B-11D).

The architect may specify physical switches and ports to add to the virtual switch. For example, the architect may add port A of physical switch PSW1 and port B of physical switch PSW2 to virtual switch VSW1.

The architect may specify a network address (e.g., a MAC address) that corresponds to a specific network device. For example, the architect may add a MAC address associated with a specific laptop to virtual switch VSW1. In this arrangement, the virtual switch may be dynamically updated with a port associated with the given laptop. The laptop may initially be connected to port C of physical switch PSW1. In this case, port C of physical switch PSW1 may be automatically added by controller server 200 to virtual switch VSW1. The laptop may be disconnected from port C of physical switch PSW1 and connected to port G of physical switch PSW2. In this case, controller server 200 may automatically remove port C of physical switch PSW1 from virtual switch VSW1 and add port G of physical switch PSW2 to virtual switch VSW1.

Controller server 200 may have access to tags that associate an alias (e.g., a name) with one or more network devices or ports. For example, a first tag may associate the alias "electronic payment client" with the MAC addresses corresponding to electronic payment clients and a second tag may associate the alias "computer science department" with a combination of MAC addresses and physical ports that are associated with network devices from a computer science department. The tags may be stored in a local database such as database 220A or a remote database such as database 220B that is connected to controller server 200 via path 222. An architect may specify the alias of a tag when issuing an add port command that adds each of the network devices or ports associated with the tag to a specified virtual switch. For example, the architect may specify the alias "electronic payment client" when issuing the add port command. The controller server may receive the alias "electronic payment client" and search for entries containing the received alias in databases such as database 220A and 220B. If an entry is found containing the received alias (e.g., "electronic payment client), the controller server may add the ports or devices specified in the entry to the given virtual switch.

During the operations of step 306, the architect may assign administrators to the virtual switches. For example, the architect may issue a add user command that assigns an administrator to a given virtual switch (e.g., using the username command of FIG. 11E).

Each virtual switch may have an associated access control list (ACL) that controls the flow of network traffic through the input-output ports of the virtual switch. FIG. 13 shows an illustrative access control list (ACL) that may be associated with virtual switch VSW1. Each entry in the access control list may include a rule name, an allow/deny field, a source field, a destination field, a port field, and an all field. The allow/deny field may specify whether the entry is allowing or denying network traffic. The source field may specify that the entry controls packets addressed from a particular network source. The destination field may specify that the entry controls packets addressed to a particular network destination. The port field may specify that the entry controls packets arriving on a particular port. The all field may specify whether packets are inbound (i.e., arriving at port from a network outside of a local network associated with the virtual switch) or outbound (i.e., originating from a local network associated with the virtual switch). In the example of FIG. 13, a first entry (i.e., RULE1) may specify that network traffic from the internet destined for end host EH1 that arrives on port B may be denied (e.g., the packets associated with the network traffic may be dropped). A second entry (i.e., RULE2) may specify that network traffic from an end host EH1 destined for the internet that arrives on port A may be allowed.

Figure 14:
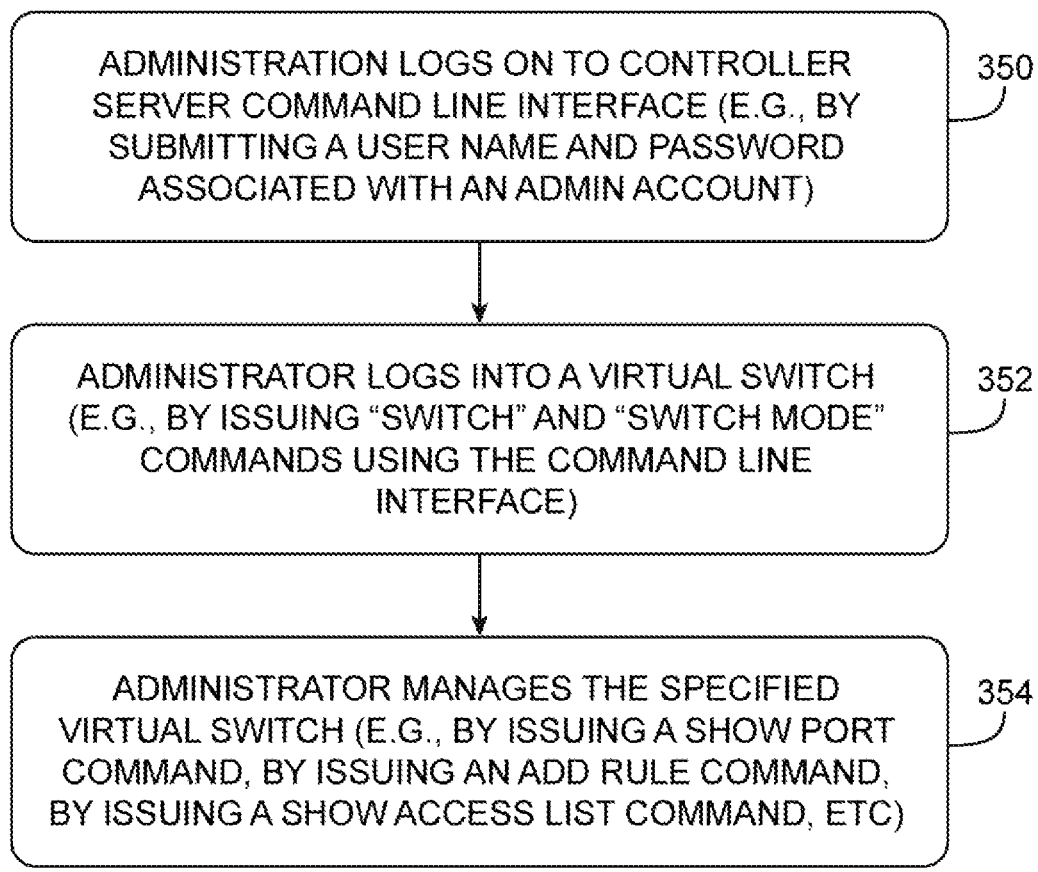
FIG. 14 is a flow chart with illustrative steps that an administrator may perform to manage a virtual switch in accordance with an embodiment of the present invention.

An administrator may configure an assigned virtual switch using controller server 200. The flow chart of FIG. 14 shows illustrative steps that an administrator may perform to configure a virtual switch that has been assigned to the administrator (e.g., assigned to the administrator by an architect).

During the operations of step 350, the administrator may connect to controller server 200 by logging on to a command line interface (CLI) on controller server 200. For example, computing equipment containing a display 205 may present the administrator with an on-screen opportunity to log into a command line interface via the secure shell (SSH) protocol. To log on to the command line interface, the administrator may submit a corresponding user name and password. The computing equipment may transmit the submitted user name and password to controller server 200. Controller server 200 may authenticate the login information by examining databases such as database 220A (e.g., the controller server 200 may search for an entry in database 220A that contains the submitted user name and password). If an entry containing the submitted user name and password is found, controller server 200 may transmit a confirmation to the administrator (e.g., controller server 200 may transmit a confirmation network packet to computing equipment operated by the administrator).

During the operations of step 352, the administrator may specify which virtual switch to configure (e.g., the administrator may log into the command line interface for the specified virtual switch by issuing switch and switch mode commands using the command line interface). The administrator may only be allowed to configure virtual switches that are assigned to the administrator (e.g., controller server 200 may prevent the administrator from specifying a virtual switch that has not been assigned to the administrator).

During the operations of step 354, the administrator may monitor and configure the specified virtual switch (e.g., by using the command line interface or other appropriate interfaces). For example, the administrator may issue a show port command to view the input-output ports associated with the virtual switch. The administrator may issue add rules commands to control network traffic through the virtual switch (e.g., by adding rules to the access control list associated with the switch).

When using the commands of FIGS. 11A-11H with a command line interface, a user (e.g., an architect or administrator) may use character strings that are a subset of the character strings shown in FIGS. 11A-11H. For example, to issue a "show port" command to a command line interface, an architect may send the character string "sh port" in place of "show port." The command line interface may interpret the "sh port" character string as a corresponding "show port" command and send the corresponding "show port" command to a controller server in place of the "sh port" command. The command line interface may interpret any subset of any command in this way (e.g., "sh access list" may correspond to "show access list", "sho port" may correspond to "show port," etc.).

When using the commands of FIGS. 11A-11H with a command line interface, a user may use character strings that contain a subset of the character strings shown in FIGS. 11A-11H followed by a tab character (e.g., the <TAB>character). For example, a user may issue a command "sh<TAB>port" to the command line interface. In response to receiving the command "sh<TAB>port," the command line interface may interpret the "sh<TAB>port" character string as a corresponding "show port" command.

A user may obtain a list of available commands by issuing a "?" command (i.e., the character string "?") to a command line interface. For example, an architect may issue a "?" command to a command line interface associated with a given virtual switch. A controller server may receive the "?" command and reply with a list of available commands (e.g., a list containing "show port," "show access list," "membership-rule," and other commands that the architect may issue on the command line interface).

Figure 15:
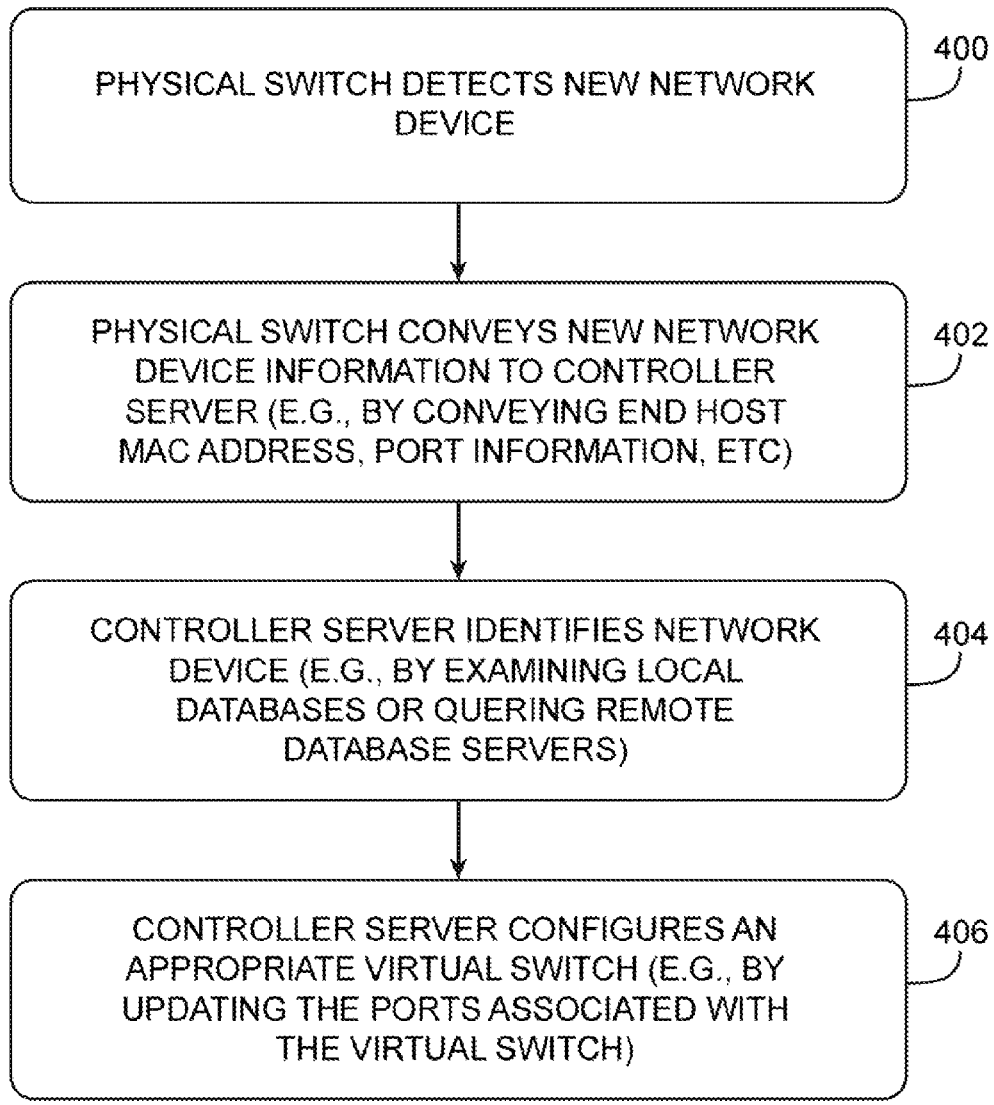
FIG. 15 is a flow chart with illustrative steps involved in dynamically updating a virtual switch to accommodate network devices that connect to and disconnect from ports of switches in a network in accordance with an embodiment of the present invention.

A network may be dynamically modified by network devices that connect and disconnect from virtual switches in the network. To accommodate these changes, the ports associated with a virtual switch may be appropriately modified using the illustrative steps of FIG. 15. The steps of FIG. 15 may be herein described using the arrangement of FIGS. 9 and 10. However, it should be understood that the steps of FIG. 15 may be performed to dynamically update ports for any virtual switch that is controlled by a controller server.

During the operations of step 400, a physical switch may detect a new network device (e.g., an end host that does not have any corresponding entries in a flow table). For example, physical switch PSW1 may detect that a new end host EH1 has been connected to port A of physical switch PSW1.

During the operations of step 402, the physical switch may transmit information associated with the detection of end host EH1 to controller server 200 (e.g., MAC address information, port information, etc.).

During the operations of step 404, controller server 200 may use the received information to identify the detected network device. The controller server may examine a local database to identify whether an entry exists that corresponds to the MAC address of the detected network device (e.g., controller server 200 may search for an entry in local database 220A that contains the MAC address of end host EH1). The controller server may query remote databases to identify the connected network device. For example, end host EH1 may be an electronic payment client. The controller server may query a corresponding electronic payment server (e.g., a remote database 220B on the electronic payment server) to identify whether or not end host EH1 is an electronic payment client.

During the operations of step 406, controller server 200 may configure an appropriate virtual switch to accommodate the identified network device. For example, end host EH1 may be moved from port A of physical switch PSW1 to port G of physical switch PSW2. If end host EH1 has a corresponding entry in local database 220A specifying that end host EH1 belongs to virtual switch VSW1, then controller server 200 may configure virtual switch VSW1 to add port G of physical switch PSW2 and remove port A of physical switch PSW1.

The foregoing is merely illustrative of the principles of this invention and various modifications can be made by those skilled in the art without departing from the scope and spirit of the invention.

What is claimed:

1. A method of managing a virtual network switch that includes ports from multiple physical network switches, comprising:
with a command line interface implemented on computing equipment, receiving a virtual network switch name from a user that identifies the virtual network switch;
with the command line interface, receiving a show port command from the user; and
in response to receiving the show port command, using the computing equipment to display a list of the ports of the virtual network switch.

2. The method defined in claim 1 wherein no two ports of the virtual network switch are directly connected to each other, wherein displaying the list of the ports of the virtual network switch comprises displaying a list of ports of the virtual network switch that contains no two ports that are directly connected to each other.

3. The method defined in claim 2 further comprising:
receiving a user name and a password from the user with the command line interface implemented on the computing equipment;
sending the user name and password to a controller server for authentication;
following authentication of the user name and password by the controller server, receiving information from the controller server indicating that the user has been authenticated; and
in response to receiving the information indicating that the user has been authenticated, receiving the virtual network switch name from the user with the command line interface implemented on the computing equipment.

4. The method defined in claim 2 further comprising:
in response to receiving the show port command with the command line interface, transmitting the show port command from the computing equipment to a controller server; and
receiving the list of ports of the virtual network switch from the controller server.

5. The method defined in claim 4 wherein receiving the show port command with the command line interface comprises receiving the string "show port" with the command line interface.

6. The method defined in claim 2 further comprising:
receiving an add rule command from the user with the command line interface; and
in response to receiving the add rule command, modifying an access control list associated with the virtual network switch.

7. The method defined in claim 6 wherein receiving the add rule command comprises using the command line interface to receive a text string including "access-list" and to receive a port name from the user that specifies a port of the virtual network switch that is associated with the add rule command.

8. The method defined in claim 7 wherein receiving the add rule command comprises receiving a rule that controls traffic associated with the port of the virtual network switch specified by the port name, the method further comprising:
in response to receiving the text string "access-list" and the port name, adding the rule to the access control list associated with the specified port of the virtual network switch.

9. The method defined in claim 7 wherein modifying the access control list comprises adding an entry to the access control list that allows network traffic through the port of the virtual network switch specified by the port name.

10. The method defined in claim 7 wherein modifying the access control list comprises adding an entry to the access control list that blocks network traffic through the port of the virtual network switch specified by the port name.

11. A method of using a controller server to manage a virtual network switch that includes ports from multiple physical network switches, wherein each of the multiple physical network switches includes a controller client that communicates with the controller server, comprising:
with a command line interface implemented on computing equipment, receiving a virtual network switch name from a user that identifies the virtual network switch;
with the command line interface, receiving an add port command from the user;
receiving the add port command from the computing equipment at the controller server; and
in response to receiving the add port command at the controller server, adding a port to the virtual network switch.

12. The method defined in claim 11 wherein receiving the add port command at the controller server comprises receiving an add port command that identifies a port associated with one of the multiple physical network switches.

13. The method defined in claim 11 wherein receiving the add port command at the controller server comprises receiving an add port command that identifies a network address associated with a network device.

14. The method defined in claim 13 wherein receiving the add port command at the controller server comprises receiving a media access control address associated with a network device.

15. The method defined in claim 14 further comprising:
with the controller server, determining that the network device associated with the media access control address is connected to a given one of the ports of the multiple physical network switches; and
in response to determining that the network device associate with the media access control address is connected to the given one of the ports of the multiple physical network switches, using the controller server to add the given one of the ports to the virtual network switch.

16. The method defined in claim 15 further comprising:
with the controller server, determining that the network device associated with the media access control address is connected to a different one of the ports of the multiple physical network switches and is no longer connected to the given one of the ports; and
in response to determining that the network device associated with the media access control address is connected to the different one of the ports of the multiple physical network switches, using the controller server to add the different one of the ports to the virtual network switch and remove the given one of the ports from the virtual network switch.

17. The method defined in claim 15 wherein receiving the add port command comprises receiving a tag associated with at least one network device.

18. The method defined in claim 17 further comprising:
with the controller server, determining from the tag that the at least one network device is connected to at least one of the ports of the multiple physical network switches; and
in response to determining that the at least one network device is connected to the at least one of the ports, using the controller server to add the at least one of the ports to the virtual network switch.

19. A method of managing a virtual network switch that includes ports from multiple physical network switches, comprising:
with a command line interface implemented on computing equipment, receiving a virtual network switch name from a user that identifies the virtual network switch;
with the command line interface, receiving a show access list command from the user; and
in response to receiving the show access list command, using the computing equipment to display an access control list that contains rules, wherein the rules are associated only with the ports of the virtual network switch.

20. The method defined in claim 19 further comprising:
with a controller server, using the rules of the access control list to control network traffic through the ports of the virtual network switch.

* * * * *